United States Patent
Boudnik et al.

(10) Patent No.: US 7,257,613 B2
(45) Date of Patent: Aug. 14, 2007

(54) METHODS TO DEVELOP REMOTE APPLICATIONS WITH BUILT IN FEEDBACK ABILITY FOR USE IN A DISTRIBUTED TEST FRAMEWORK

(75) Inventors: Konstantin I. Boudnik, Santa Clara, CA (US); Weiqiang Zhang, San Jose, CA (US); Alexei Volkov, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 697 days.

(21) Appl. No.: 09/989,928

(22) Filed: Nov. 20, 2001

(65) Prior Publication Data
US 2003/0115252 A1   Jun. 19, 2003

(51) Int. Cl.
*G06F 15/16* (2006.01)
(52) U.S. Cl. ............... 709/202; 709/230; 719/328; 719/329; 719/330
(58) Field of Classification Search ........... 709/202
See application file for complete search history.

(56) References Cited

U.S. PATENT DOCUMENTS 6,487,607 B1 *  11/2002  Wollrath et al. ............ 719/330

OTHER PUBLICATIONS

Jaworski, "Developer's Guide: Java 1.1," Sams.net Publishing, Second Edition, p. 63.*
Process Manager 6.0 Programmers's Guide, May 2, 2000 at http://docs.sun.com/source/816-5870-10/cust_act.htm.*

* cited by examiner

*Primary Examiner*—Yves Dalencourt
(74) *Attorney, Agent, or Firm*—Martine Penilla & Gencarella, LLP

(57) ABSTRACT

Providing remote applications having built in feedback ability in a distributed test framework. A first application program having a call interface is launched using a first agent process, which includes an agent launcher interface. The call interface provides a reference to the first agent process, which allows communication between the application program and the agent process. A launch request is sent from the first application to the agent launcher interface using the reference. The launch request specifies a second application to be launched and also defines attributes of a processing resource. The second application is then launched on a processing resource having the attributes defined in the launch request.

17 Claims, 8 Drawing Sheets

METHODS TO DEVELOP REMOTE APPLICATIONS WITH BUILT IN FEEDBACK ABILITY FOR USE IN A DISTRIBUTED TEST FRAMEWORK

CROSS REFERENCE TO RELATED APPLICATIONS

This application is a continuation-in-part of U.S. patent application Ser. No. 09/953,223, filed Sep. 11, 2001, and entitled "Distributed Processing Framework System," which is incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to network software testing, and more particularly, to methods and systems for custom application development for remote applications having built in feedback ability in a distributed test framework.

2. Description of the Related Art

As the use of software in performing daily tasks is increasing rapidly, assessing software reliability through software testing has become an imperative stage in software development cycle. As is well known, software testing is used to find and eliminate defects (i.e., bugs) in software, which if undetected, can cause the software to operate improperly. In general, a stand-alone computer or a network of computer resources can perform software testing. When a stand-alone computer system is used to perform the software testing, the computer system is programmed to run a test selected by the software user. Comparatively, if a network of computer resources is used, the user is responsible for manually adding and deleting the computer resources to the network, programming the master computer system and the server, initiating the running of a user-selected test, and running the test on the group of dedicated computer systems coupled to the server.

In either scenario, a heavy user interface is required for initiating the software testing on the master computer, scheduling the running of the specific test on the system resources, adding and deleting of the system resources, keeping track of the system resources and their respective hardware and software configuration, and maintaining the system resources. Also, in either case, dedicated system resources perform the software testing. That is, the system resources are designed to solely be used for software testing.

Further, when operating a network of computer resources, some type of client control software generally is necessary to communicate test results back to the master computer system. Generally, the test creates a test results file during execution, which can be read by the client control software and provided to the master system after test execution. However, prior art client control software does not provide a mechanism to continue communication and management for tests initiated by the client control software. That is, once the client control software launches a test, the test executes without further communication with the client control software. Although some prior art systems allow client control software to "kill" a test job, no meaningful communication is provided that allows further management of an executing tests.

In view of the foregoing, there is a need for a flexible methodology and system capable of selecting and utilizing dynamic, cross-platform computer resources to process a computer software. Further, the system should be capable of allowing continued communication between client control software and launched applications.

SUMMARY OF THE INVENTION

Broadly speaking, the present invention fills these needs by providing systems and methods for remote application development having built in feedback ability for use in a distributed processing framework (DPF) system. In one embodiment, a method for launching remote applications in a distributed test framework is disclosed. A first application program having a call interface is launched using a first agent process, which includes an agent launcher interface. The call interface provides a reference to the first agent process, which allows communication between the application program and the agent process. A launch request is sent from the first application to the agent launcher interface using the reference. The launch request specifies a second application to be launched and also defines attributes of a processing resource. The second application is then launched on a processing resource having the attributes defined in the launch request.

In another embodiment, a system is disclosed for launching remote applications in a distributed test framework. The system includes a first agent process executing on a first processing resource, where the first agent process includes an agent launcher interface. In addition, a first application program is included that has a call interface that provides a reference to the first agent process. The first application is capable of sending a launch request to the agent launcher interface using the reference. As above, the launch request specifies a second application to be launched and defines attributes of a processing resource, which can be used to execute the second application.

A computer program embodied on a computer readable medium for launching remote applications in a distributed test framework is disclosed in a further embodiment of the present invention. The computer program includes a code segment that receives a reference to a first agent process, where the reference can be utilized to access the first agent process during execution. In addition, a code segment is included that receives initialization parameters for an application. The initialization parameters can be used to set initial values for specific parameters of the application. The system further includes a code segment that calls an agent launcher interface of the agent process using the reference. The program can send a request to launch a second application to the agent launcher interface, and can pass attributes of a processing resource to the agent launcher process for use in launching the second application. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
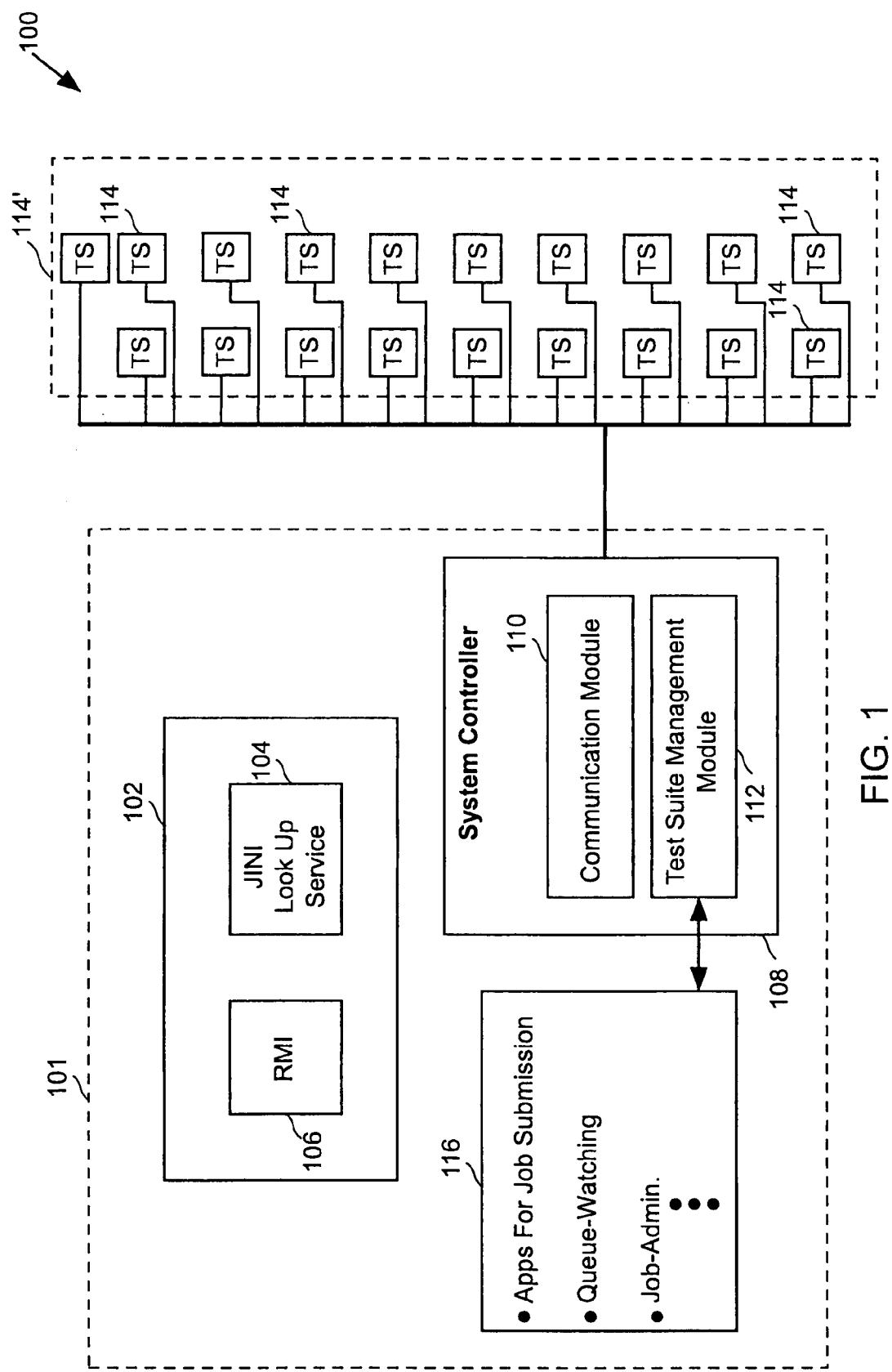
FIG. 1 is a block diagram illustrating a distributed test framework (DTF) system, in accordance with one embodiment of the present invention.

An invention is disclosed for remote application development with built in feedback ability for use in a distributed processing framework (DPF) system. Embodiments of the present invention allow continued communication between launched applications, such as test harnesses, and the agent processes. As a result, embodiments of the present invention allow enhanced test execution management. In particular, embodiments of the present invention allow test applications to launch sub-tasks test applications by way of a user design service (UDS), which allows two-way communication between an agent process and a launched application. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As used herein, an "ad-hoc" or a "dynamic" network is defined as a network in which the computer resources may be part of the network temporarily and for a specific length of time (i.e., spontaneous). In one example, the DPF system of the present invention implements the Jini™ (hereinafter "Jini") technology to provide spontaneous interaction between its components. In this manner, the computer systems attach to and detach from the ad-hoc network of processing resources (e.g., computer resources) without disturbing the DPF system. Accordingly, the computer resources of the present invention are not limited to executing processes submitted to the DPF system of present invention.

DPF systems of the embodiments present invention can be distributed test framework (DTF) systems configured to manage test suite execution on cross-platform dynamically networked computer systems. In one implementation, the DTF system can include a server computer system and a plurality of ad-hoc network of processing resources configured to spontaneously interact implementing the Jini technology. The server computer system is configured to include a Jini look up service and a system controller configured to manage the processing of the submitted test suites. In one instance, the plurality of computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As embodiments of the present invention can implement the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews of Jini and Java as they relate to the embodiments of the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it should be noted that in other embodiments, the system controller 108 can implement any suitable mechanism to manage the communication between the system controller 108 and the distributed test systems 114 (e.g., Jini, RMI, TCP/IP Sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working hours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 of the present invention can physically be divided into two groups, logically, the DTF system 100 of the embodiments of present invention comprises three over all components: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Quit an appropriate shell script to destroy all the processes.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

Figure 2:
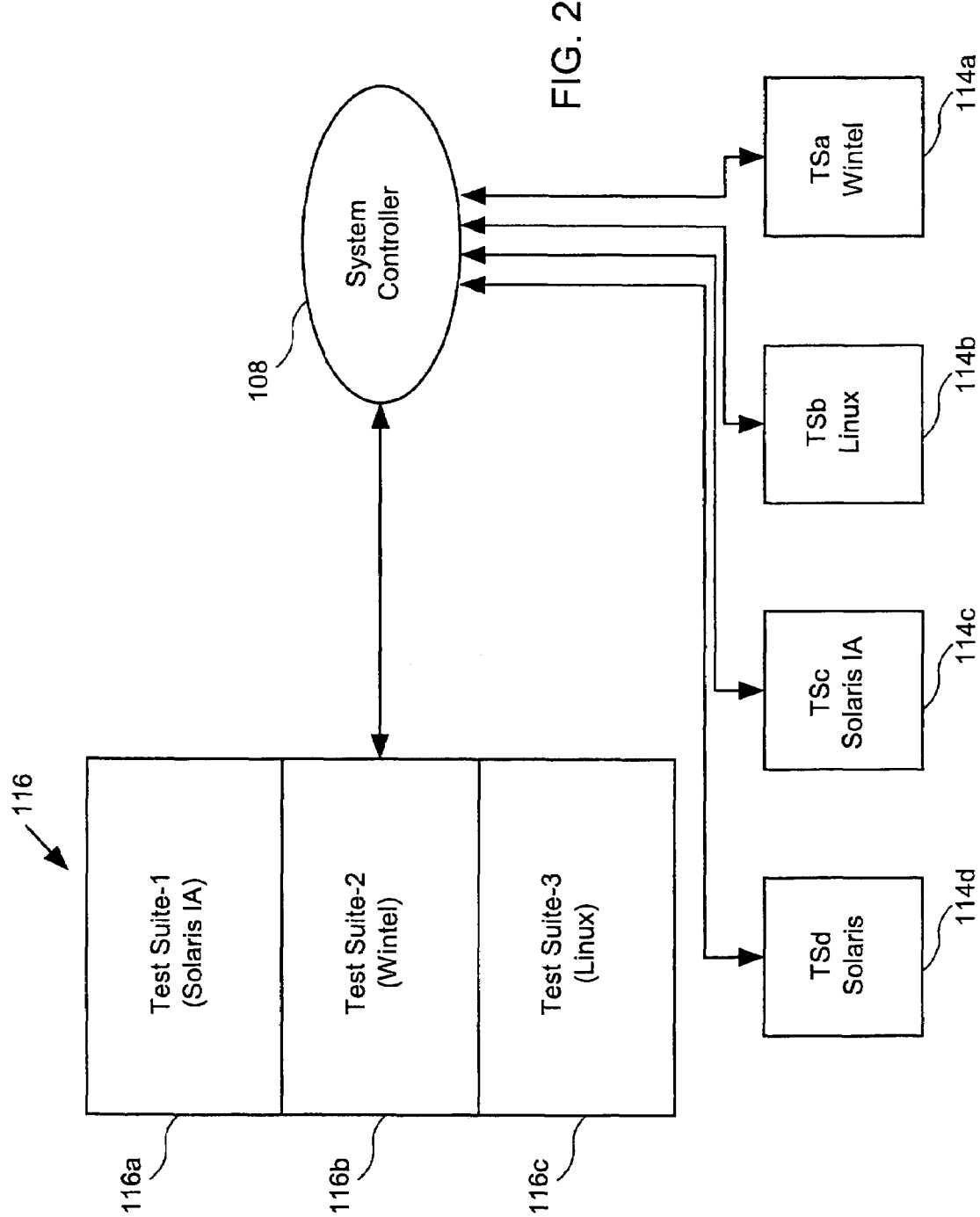
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the present invention to intelligently locate a test system 114 available to execute a test suite is illustrated, in accordance with one embodiment of the present invention. As shown, an inqueue directory 116 contains a plurality of test execution requests 116a, 116b, and 116c. In accordance with one embodiment of the present invention, once the system controller 108 is initiated, the system controller 108 is designed to read each test execution request 116a-116c contained within the inqueue directory 116. As shown, each test suite request 116a-116c must be executed by a test system 114 capable of running the test execution request requirements. For instance, each of the test execution requests 116a, 116b, and 116c must be run on a Solaris IA™ test system, a Wintel™ test system, or a Linux™ test system, respectively. The DTF system 100 of the present invention has the capability to advantageously locate an available test system from a plurality of ad-hoc network of test systems 114a, 114b, 114c, and 114d to execute each of the test execution requests 116a-116c.

As shown in the embodiment depicted in FIG. 2, each of the test systems 114a-114d has a different software and hardware configuration. For instance, while the test system 114a is run on Wintel™ and the test system 114b is run on Linux™, the test systems 114c and 114d are programmed to run on Solaris IA™ and Solaris™, respectively. As will be discussed in more detail below, the machine service for each test system 114a-114c registers the respective test system 114a-114c with the Jini look up service using the Jini attributes. Particularly, the embodiments of the present invention are configured to register the hardware and software configuration for each test system 114a-114d with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114c, 114a, and 114b to execute the test suite requests 116a-116c, respectively.

Figure 3:
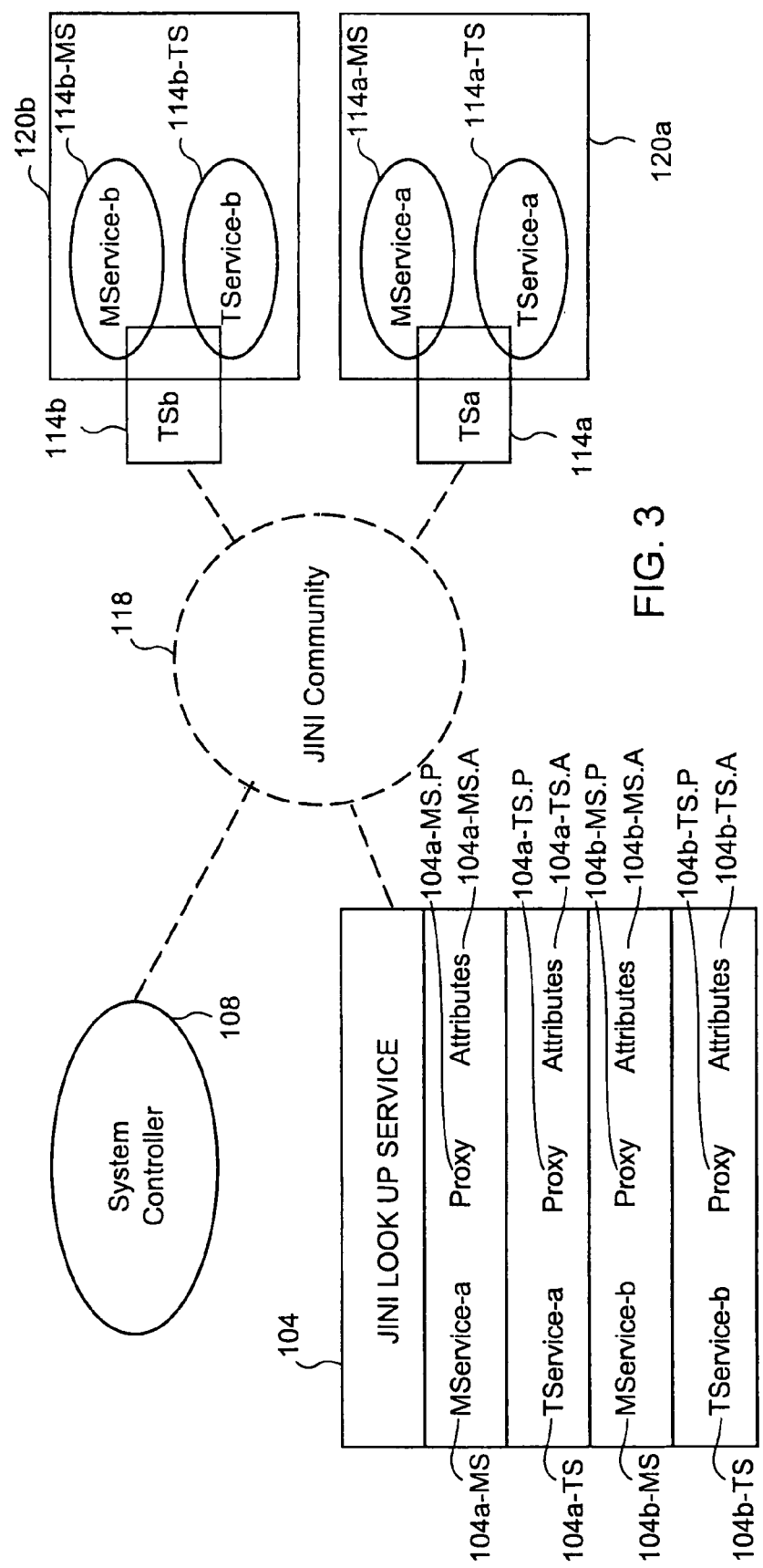
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini enabled form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request while interacting with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services of the DTF system of the present invention are configured to spawn other suitable test systems. As shown, similar to test system 114a, the test system 114b is configured to include an agent 120b designed to include a machine system 114b-MS and a test system 114b-TS.

As will be discussed in greater detail below and as shown in the implementation of FIG. 3, the machine service 114a-MS and test service 114a-TS, respectively, register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are then used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. In such a situation, the Jini look up service 104 will include two test services each running a different type of test execution request. As a consequence, when the processing of one type of test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104. Further information on DPF system operation can be found in parent U.S. patent application Ser. No. 09/953,223, filed Sep. 11, 2001, and entitled "Distributed Processing Framework System," which is incorporated herein by reference.

In addition to providing efficient access to remote resources, embodiments of the present invention allow continued communication between launched applications, such as test harnesses, and the agent processes. As a result, embodiments of the present invention allow enhanced test execution management. In particular, embodiments of the present invention allow test applications to launch sub-tasks test applications by way of a user design service (UDS). The UDS is an interface configuration, which allows two-way communication between an agent process and a launched application.

Figure 4:
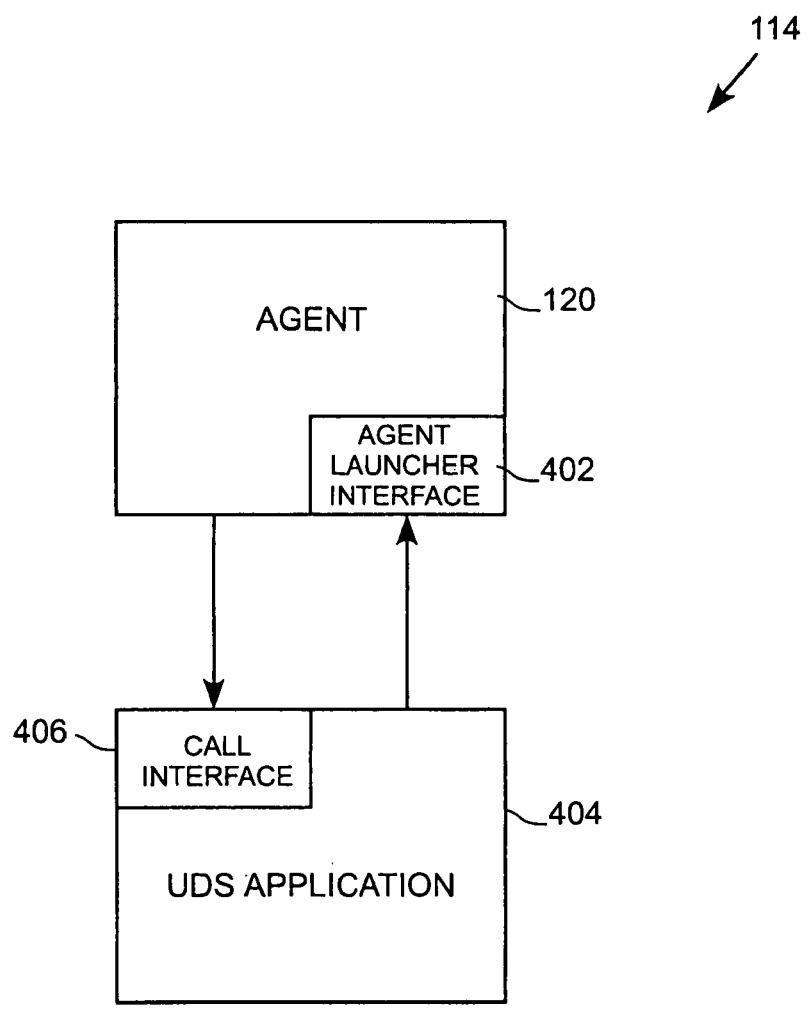
FIG. 4 is a logical diagram showing a test system having UDS communication, in accordance with an embodiment of the present invention.

FIG. 4 is a logical diagram showing a test system 144 having UDS communication, in accordance with an embodiment of the present invention. Executing on the test system 144 is an agent process 120 and a UDS application 404. The agent process 120 includes an agent launcher interface 402 and the UDS application 404 includes a call interface 406. As mentioned previously, the agent process 120 executes on the test system 114 and provides control for local running test applications. The UDS application 404 can be an application implementing a UDS, such as a test harness implementing the call interface 406. For example, during a typical test job, the agent process 120 starts the UDS application 404, which in this example is a test harness, utilizing the call interface 406, which provides a mechanism for the UDS application to communicate with the agent process 120 during test execution.

In addition, as mentioned above, embodiments of the present invention allow test processes to launch sub-tasks test processes. This is facilitated via the agent launcher interface 402, which is implemented by the agent process 120. Broadly speaking, agent launcher interface 402 allows the UDS application 404 to launch a second UDS application. In particular, the UDS application 404 can specify the second UDS application to be launched, the resource requirements for the second UDS application, and any initialization parameters to be used when launching the second UDS application. The second UDS application is then launched using an implementation of the call interface 406.

Figure 5:
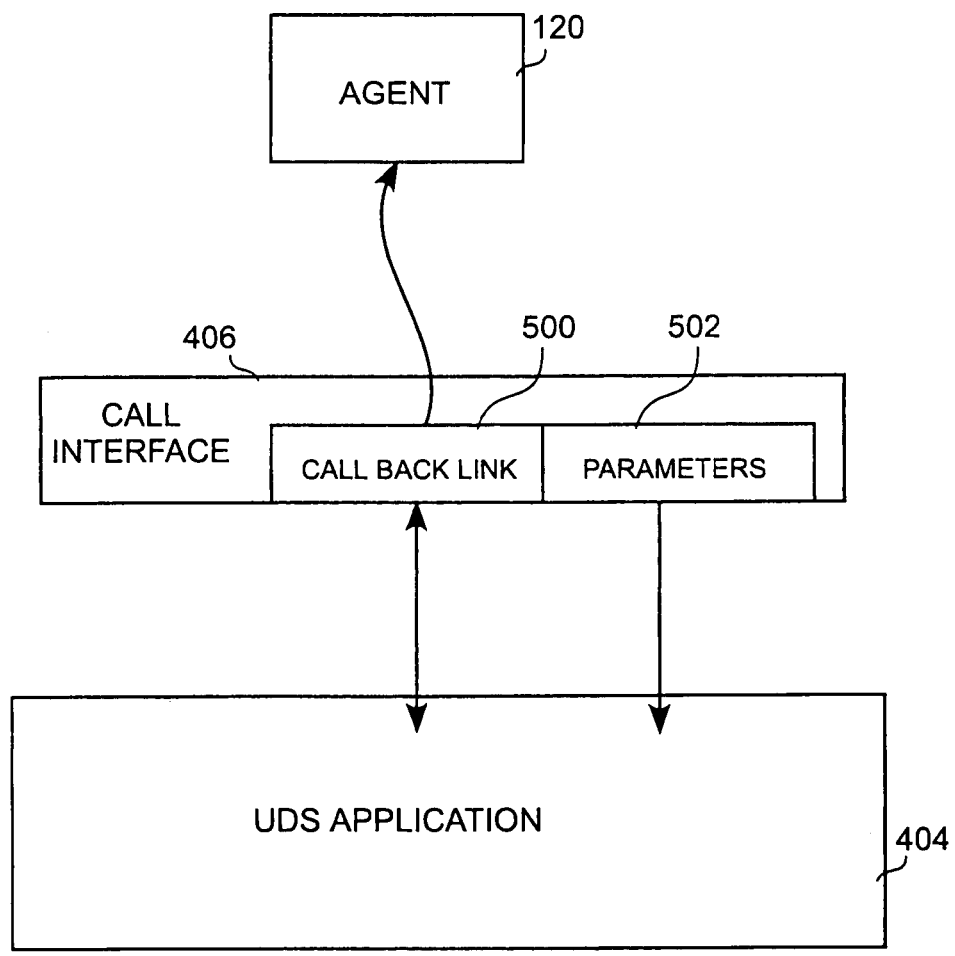
FIG. 5 is a logical diagram showing a call interface communication configuration, in accordance with an embodiment of the present invention.

FIG. 5 is a logical diagram showing a call interface communication configuration, in accordance with an embodiment of the present invention. As shown in FIG. 5, the call interface 406 provides an interface between the UDS application 404 and the agent process 120. The call interface 406 includes a call back link 500 and a parameters hash table 502. As mentioned previously, the call back link 500 provides a mechanism for the UDS application to communicate with the agent process 120 during execution. In particular, the call back link 500 is a reference to the agent process 120. In this manner, the UDS application can access agent process 120 methods during execution, as described in greater detail subsequently.

The parameters hash table 502 provides initialization parameters to the UDS application 404. Hence, the parameters hash table 502 provides specific values of specific parameters to the UDS application 404. For example, the parameters hash table 502 can provide the UDS application 404 with the host name of the test system and the host address of the test system. In one embodiment, the call interface 406 is implemented as a method within the UDS application 404. Table 1 below includes illustrative code for implementing a call interface 406, in accordance with an embodiment of the present invention. Of course, the code can take any form so long as it provides a call back link 500 and parameters 502 for the UDS application.

TABLE 1

```
package external.interfaces;
import java.util.Hashtable;
public interface CallInterface {
    /**
     * runSevice defines the interface to UDS main method
     * @param CallBackLink instance of ServiceProxy class to pass
       the parameters as defined in external.interfaces AgentLauncher
     * @param params The set of parameters to be passed into UDS
     */
    Object runService (Object CallBackLink, Hashtable params)
        Throws Exception;
}
```

In the example of table 1 above, the call interface 406 is implemented as a method named runService, which includes parameters CallBackLink and params. The CallBackLink parameter corresponds to the call back link 500 of FIG. 5, and provides an object having a reference to the agent process 120. In this manner, the UDS application 404 can utilize the CallBackLink object to access methods within the agent process 120, as described in greater detail subsequently. The params parameter corresponds to the parameters hash table 502 in FIG. 5. The params parameter provides a hash table that can be used to provide initialization parameters to the UDS application 404.

In operation, the agent process 120 calls the method runService, which functions as the call interface 406 for the UDS application 404. When calling the method runService, the agent process passes the parameter CallBackLink, which provides a reference back to the agent process 120, and the parameter params, which provides any initialization values to the UDS application. Thereafter, the runService method executes the UDS application using the params parameters to provide initialization values to the UDS application. Hence, utilizing the embodiments of the present invention, UDS applications can communicate with the agent process 120, thus providing increased application management. To further enhance application management, embodiments of the present invention allow sub-processes to be launched from UDS applications via the agent process 120.

Figure 6:
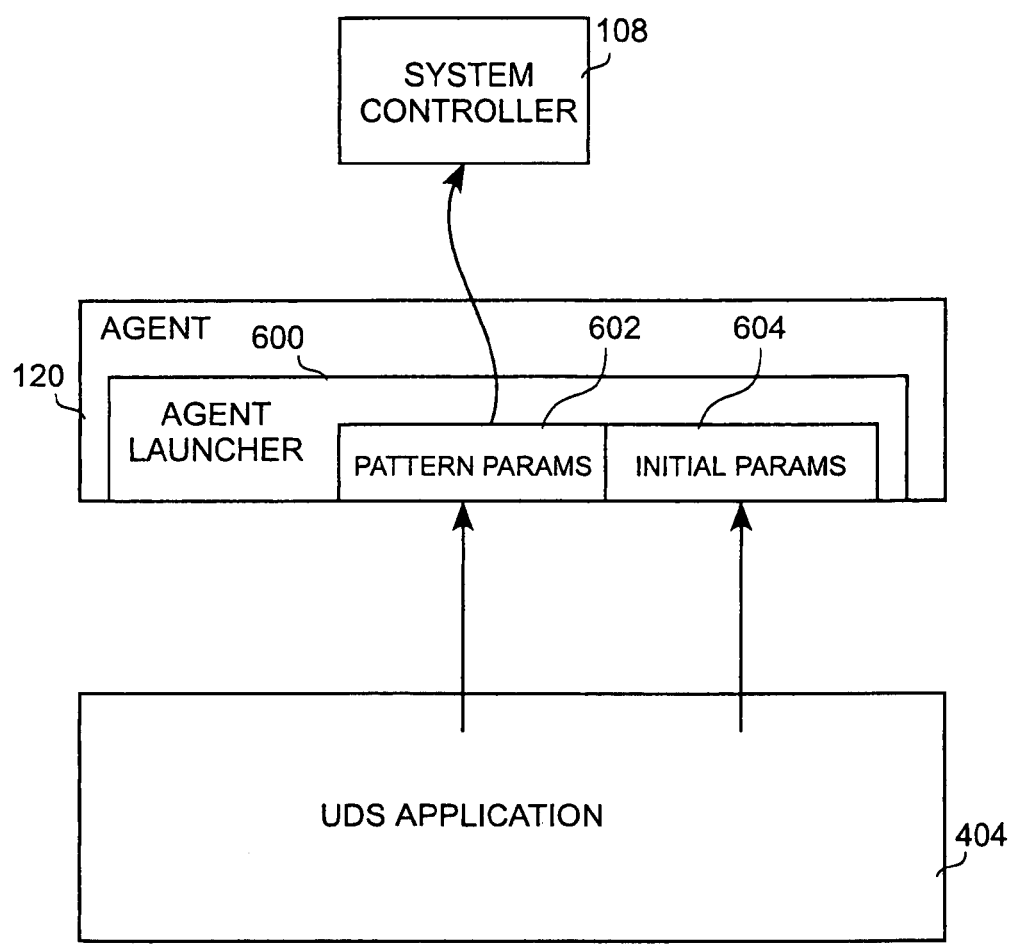
FIG. 6 is a logical diagram showing an agent launcher configuration, in accordance with an embodiment of the present invention.

FIG. 6 is a logical diagram showing an agent launcher configuration, in accordance with an embodiment of the present invention. Using the agent launcher configuration of the embodiments of the present invention, UDS applications can request agent processes to launch further UDS applications. To facilitate this functionality, each agent process 120 implements an agent launcher interface 600, which includes pattern parameters 602 and initial parameters 604.

The pattern parameters 602 specify the attributes of a processing resource suitable for use in processing the launch request, which for example, could be a test execution request. As will be described in greater detail subsequently, the attributes specified by the pattern parameters 602 are used, in conjunction with the Jini lookup service, to find a processing resource that matches particular test requirements. For example, if a particular test execution request required a Linux test system, the pattern parameters 602 can be set to indicate this requirement. The pattern parameters 602 are set by the UDS application 404 when requesting an application launch from the agent process 120, as described in greater detail below.

The initialization parameters 604 specify initialization parameters to the application to be launched. Hence, the parameters 604 provide specific values of specific parameters to the application to be launched. For example, the initialization parameters 604 can provide the application with the host name of the test system or the host address of the test system. As with the pattern parameters 602, the initialization parameters 604 are set by the UDS application 404 when requesting an application launch from the agent process 120.

As mentioned above, embodiments of the present invention allow UDS applications 404 to request agent processes 120 to launch other UDS applications. To launch a sub-application, a UDS application 404 sends a request to the agent process 120 using the agent launcher interface 600 in conjunction with the call back link 500, discussed above with reference to FIG. 5. The call back link 500 provides a reference to the agent process 120 that the UDS application 404 can utilize to communicate with the agent process 120. Using the call back link 500, the UDS application 404 sets the pattern parameters 602 to define required attributes of the processing resource to be used to execute the sub-application. In addition, the UDS application 404 sets the initial parameters 604 to provide any initial values needed by the sub-application. The agent launcher interface 600 then sends a request to the system controller 108 via the agent process 120. The system 108 controller then processes the request in a manner similar to that described with reference to FIGS. 1-3.

In one embodiment, the agent launcher interface 600 is implemented as a method within the agent process 120. Table 2 below includes illustrative code for implementing an agent launcher interface 600, in accordance with an embodiment of the present invention. Of course, the code can take any form so long as it provides pattern parameters 602 and initial parameters 604.

an application execution request to the system controller 108. The system controller 108 then determines a suitable processing resource based on the patternParams parameter using the lookup service, and launches the new application on the processing resource, as described in greater detail subsequently with respect to FIGS. 7 and 8.

Figure 7:
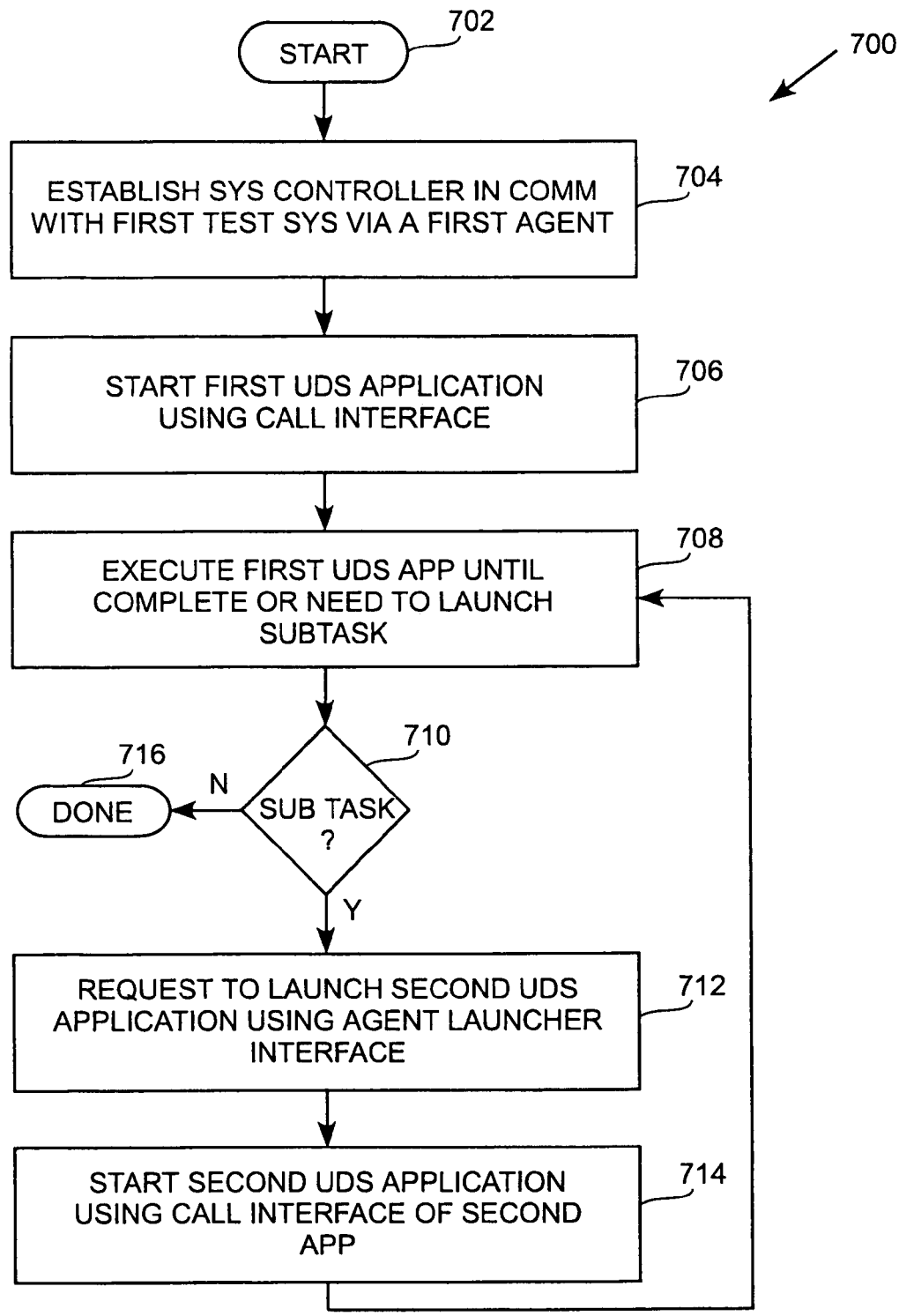
FIG. 7 is a flowchart showing a method for providing a remote program with built in feedback ability for use in a DTF, in accordance with an embodiment of the present invention.

FIG. 7 is a flowchart showing a method 700 for providing a remote program with built in feedback ability for use in a DTF, in accordance with an embodiment of the present invention. In an initial operation 702, preprocess operations are performed. Preprocess operations can include launching agent processes on test systems, registering the agent processes, and other preprocess operations that will be apparent to those skilled in the art after a careful reading of the present description.

Figure 8:
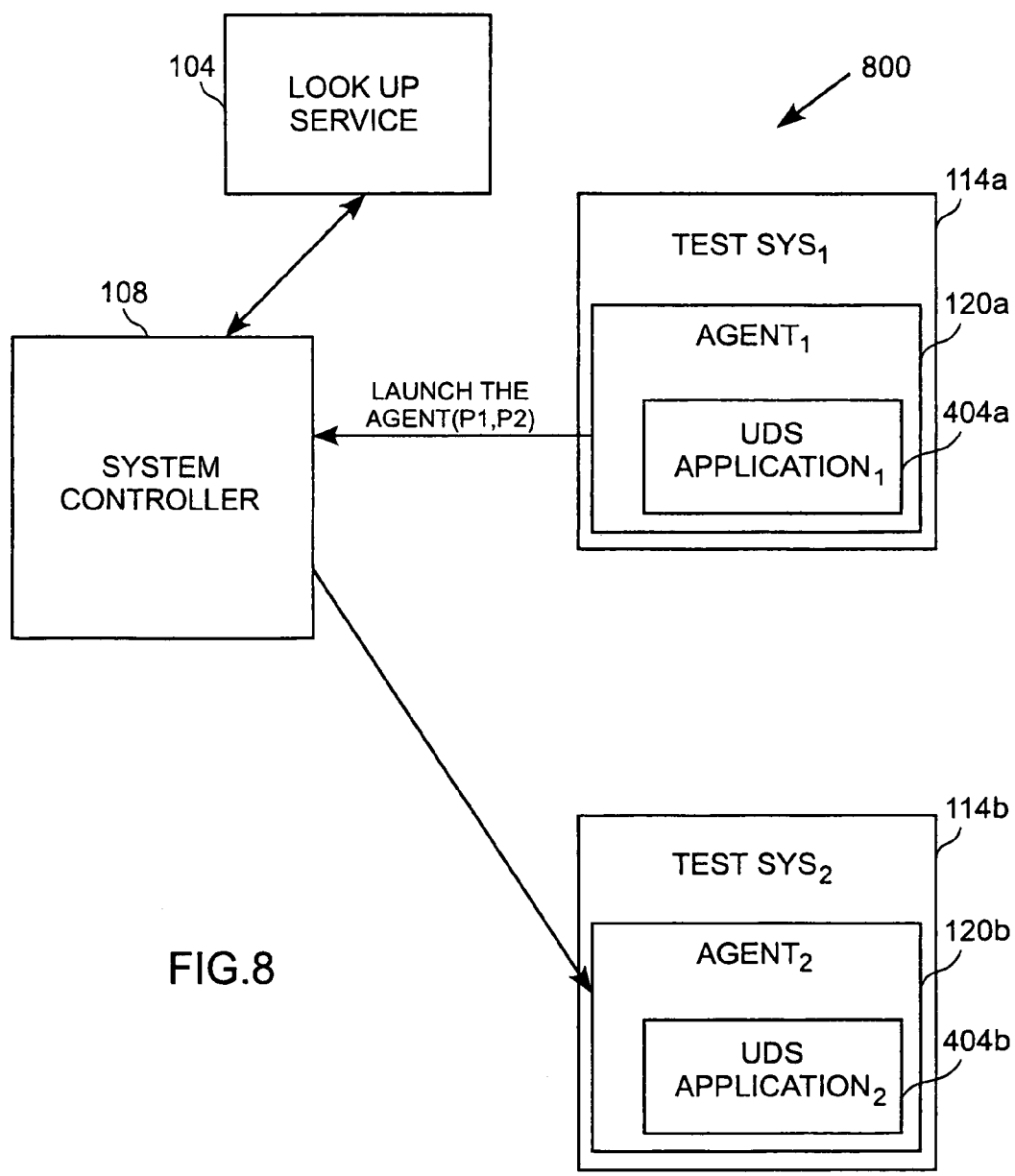
FIG. 8 is a diagram showing a DTF in accordance with an embodiment of the present invention.

In operation 704, communication is established between the system controller and a first test system via a first agent process. As mentioned above, embodiments of the present invention provide a mechanism for remote resource usage and acquisition in a dynamic network environment. FIG. 8 is a diagram showing a DTF in accordance with an embodiment of the present invention. The DTF of FIG. 8 includes a system controller 108 in communication with a lookup service 104. The system controller is also in communication with a first test system 114a via a first agent process 120a executing on the first test system 114a.

Referring back to FIG. 7, the agent process starts a first UDS application using the call interface, in operation 706. Turing to FIG. 8, the first agent process 120a starts the first UDS application 404a using the call interface implemented by the first UDS application 404a. The call interface

TABLE 2

```
package external.interfaces;
import java.util.Hashtable;
public interface AgentLauncher {
    public final static int AGENT_LAUNCH_OK = 0;
    public final static int AGENT_LAUNCH_ERROR = 1;
    public final static int AGENT_LAUNCH_IS_NOT_SUITABLE = -1;
    public final static int AGENT_LAUNCH_EXPECTATION_TIMEOUT = 360*1000;
        // patternParams - the params set to match appropriate resource
        // initParams    - the params to pass into launching client
    public int launchTheAgent (Hashtable patternParams, Hashtable initParams);
}
```

In the example of table 2 above, the application launcher interface is implemented as a method named launchTheAgent, which includes parameters patternParams and initparams. The patternParams parameter corresponds to the pattern parameters 602 of FIG. 6, and provides attributes for a processing resource suitable to execute the execution request. In this manner, the system controller can execute the new application on a processing resources matching requirements set forth by the launching UDS application. The initparams parameter corresponds to the initial parameters 604 in FIG. 6. The initparams parameter provides a hash table that can be used to provide initialization parameters to the new application.

In operation, the UDS application calls the method launchTheAgent, which functions as the agent launcher interface 600 for the agent process 120. When calling the launchTheAgent method, the UDS application 404 passes the parameter patternParams, which defines the processing resource attribute requirements, and the parameter initparams, which provides any initialization values to the new application. Thereafter, the launchTheAgent method sends includes a call back link and a hash table of parameters. The call back link is a reference to the first agent process 120a and provides a mechanism for the first UDS application 404a to communicate with the first agent process 120a during execution. The hash table of parameters provides initialization parameters to the first UDS application 404a. Hence, the hash table of parameters provides specific values of specific parameters to the first UDS application 404a. For example, the hash table of parameters can provide the first UDS application 404a with the host name of the test system or the host address of the test system.

Turning back to operation 708 of FIG. 7, the first UDS application is executed until it is completed or needs to launch a second UDS application, such as a sub-task. For example, the UDS application can be a test harness, which executes a test suite on a specific processing resource and reports the testing results. During operation, a test harness may require launching of a sub-task, which can be a second test harness.

A decision is then made as to whether the first UDS application requires launching of another application, in operation 710. As mentioned above, the first UDS application executes until it completes or until it requires another application to be launched. If the first UDS application requires another application to be launched, the method 700 continues with operation 712. Otherwise, the method is completed in operation 716.

In operation 712, a request is sent via the agent launcher interface to launch the second UDS application. Referring to FIG. 8, when the first UDS application 404a needs to launch a second application, such as a sub-task test application, the first UDS application 404a requests the second application to be launched using the agent launcher interface of the first agent process 120a.

As mentioned previously, the agent launcher interface includes pattern parameters and initial parameters. The pattern parameters specify the attributes of a processing resource suitable for use in processing the launch request. The attributes specified by the pattern parameters are used, in conjunction with the Jini lookup service 104, to find a second test system 114b that matches particular test requirements. For example, if the first UDS application 404a required a Linux test system, the first UDS application 404a sets the pattern parameters to indicate this requirement. The initialization parameters specify initialization parameters to the application to be launched. As with the pattern parameters, the first UDS application 404a sets the initialization parameters when requesting an application launch from the first agent process 120a.

The first agent process 120a then sends a test execution request to the system controller 108 having resource attribute requirements as set forth by the pattern parameters discussed above. The system controller 108 utilizes the lookup service 104 as described above with reference to FIGS. 1-3 to determine an available test system satisfying the attribute requirements defined in the pattern parameters. Upon finding a suitable test system, the system controller 108 sends an application launch request to the agent process executing on the selected test system. For example, in FIG. 8, if the second test system 114b satisfied the attribute requirements defined the pattern parameters set by the first UDS application 404a, the system controller 108 requests the second agent process 120b to launch the second UDS application 404b.

Referring back to FIG. 7, the agent process of the selected test system launches the second UDS application using the application's call interface, in operation 714. Turning to FIG. 8, the second agent process 120b launches the second UDS application 404b using the call interface implemented by the second UDS application 404b. As above, the call interface includes a call back link, which provides a mechanism for the second UDS application 404b to communicate with the second agent process 120b during execution. In addition, the call interface includes a parameters hash table, which provides initialization parameters to the second UDS application 404b. The values for the parameters hash table in the call interface is provided by the initialization parameters in the agent launcher interface utilized to facilitate launching of the second UDS application 404b.

Referring back to FIG. 7, execution of the first UDS application then continues as described above with reference to operation 708. In addition, execution of the second UDS application commences as described above with reference to operation 708. Post process operations are performed in operation 716. Post process operations can include launching additional UDS applications, reporting test results, and other post process operations as will be apparent to those skilled in the art after a careful reading of the present disclosure.

While the above described invention has been described in the general context of an application program that is executed on an operating system in conjunction with a test system, it should be appreciated that the invention may be implemented with other routines, programs, components, data structures, etc., which perform particular tasks or implement particular abstract data types. Furthermore, the invention may be practiced with other computer system configurations including hand-held devices, microprocessor systems, microprocessor-based or programmable consumer electronics, minicomputers, mainframe computers and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for launching remote test execution requests in a distributed test framework, comprising:

using a first agent process having an agent launcher interface to launch a first test execution request having a call interface, wherein the call interface provides a reference to the first agent process such that the first test execution request and the first agent process communicate with each other during execution of the first test execution request;

sending a launch request from the first test execution request to the agent launcher interface of the first agent process using the reference to the first agent process as provided by the call interface of the first test execution request, wherein the launch request specifies a second test execution request to be launched, and wherein the launch request defines required attributes of an unidentified computer system necessary to execute the second test execution request thereon;

operating the agent launcher interface to send a request to a system controller requesting identification of a computer system having the required attributes necessary to execute the second test execution request;

operating the system controller to identify the computer system having the required attributes necessary to execute the second test execution request; and launching the second test execution request on the identified computer system having the attributes defined in the launch request, wherein each of the first and second test execution requests includes commands defined to initiate a number of functional aspects of a software product to be tested when executed on a computer system.

2. A method as recited in claim 1, wherein the second test execution request is launched by a second agent process executing on the identified computer system.

3. A method as recited in claim 2, wherein the second agent process is registered with a look up service, the registering being configured to advertise the attributes of the identified computer system to the system controller via the look up service.

4. A method as recited in claim 3, wherein the system controller is configured to search the look up service to locate a computer system having attributes substantially matching the attributes defined in the launch request.

5. A method as recited in claim 4, wherein the second test execution request includes a second call interface, and the second call interface includes a parameters hash table that provides initialization values for the second test execution request.

6. A method as recited in claim 5, wherein the agent launcher interface of the first agent process further includes parameters that provide initialization values for the second test execution request.

7. A method as recited in claim 6, wherein the initialization values provided by the parameters of the agent launcher interface of the first agent process can be passed to the second call interface via the parameters hash table of the second call interface of the second test execution request.

8. A method as recited in claim 1, wherein the unidentified computer system is unidentified to the first test execution request at the time the launch request is sent from the first test execution request to the agent launcher interface of the first agent process.

9. A system for launching remote test execution requests in a distributed test framework, comprising:
    a first agent process executing on a first computer system, wherein the first agent process includes an agent launcher interface; and
    a first test execution request having a call interface that provides a reference to the first agent process such that the first test execution request and the first agent process communicate with each other during execution of the first test execution request, wherein the first test execution request is capable of sending a launch request to the agent launcher interface of the first agent process using the reference to the first agent process, the launch request specifying a second test execution request to be launched and defining required attributes of a second computer system upon which the second test execution request is to be executed without specifically identifying the second computer system,
    wherein each of the first and second test execution requests includes commands defined to initiate a number of functional aspects of a software product to be tested when executed on a computer system.

10. A system as recited in claim 9, further comprising:
    a system controller in communication with the first agent process, the system controller defined to receive a computer system identification request from the agent launcher interface of the first agent process, the system controller further defined to search a look up service to identify a computer system having the required attributes defined in the launch request.

11. A system as recited in claim 10, wherein the second test execution request includes a second call interface, and the second call interface further includes a parameters hash table that provides initialization values for the second test execution request.

12. A system as recited in claim 11, wherein the agent launcher interface of the first agent process further includes parameters that provide initialization values for the second test execution request, wherein the initialization values can be passed to the second call interface via the parameters hash table of the second call interface.

13. A computer readable storage medium encoded with program instructions for launching remote test execution requests in a distributed test framework, comprising:
    a code segment that receives a reference to a first agent process, wherein the reference can be utilized to access the first agent process during execution;
    a code segment that receives initialization parameters for a first test execution request, wherein the initialization parameters can be used to set initial values for specific parameters of the first test execution request; and
    a code segment that calls an agent launcher interface of the agent process using the reference, wherein a request to launch a second test execution request is sent to the agent launcher interface, and wherein required attributes of an unidentified computer system necessary to execute the second test execution request are passed to the agent launcher process,
    wherein each of the first and second test execution requests includes commands defined to initiate a number of functional aspects of a software product to be tested when executed on a computer system.

14. A computer readable storage medium as recited in claim 13, wherein the required attributes are utilized to select a computer system having substantially matching attributes to execute the second test execution request.

15. A computer readable storage medium as recited in claim 14, wherein the selected computer system is selected from a list of computer systems advertised on a look up service.

16. A computer readable storage medium as recited in claim 15, wherein the selected computer system includes a second agent process, and wherein the second agent process launches the second test execution request.

17. A computer readable storage medium as recited in claim 13, wherein the unidentified computer system is unidentified to the code segment that calls the agent launcher interface of the agent process using the reference at the time the request to launch the second test execution request is sent to the agent launcher interface.

* * * * *